United States Patent
Iwatschenko-Borho et al.

(10) Patent No.: US 11,105,940 B2
(45) Date of Patent: Aug. 31, 2021

(54) SYSTEM AND METHOD OF STABILIZATION OF A GAMMA AND NEUTRON DETECTING DEVICE

(71) Applicant: THERMO FISHER SCIENTIFIC MESSTECHNIK GMBH, Erlangen (DE)

(72) Inventors: Michael Iwatschenko-Borho, Roettenbach (DE); Erich Leder, Heroldsbach (DE); Ralf Pijahn, Erlangen (DE); Norbert Trost, Erlangen (DE)

(73) Assignee: Thermo Fisher Scientific Messtechnik GmbH, Erlangen (DE)

( * ) Notice: Subject to any disclaimer, the term of this patent is extended or adjusted under 35 U.S.C. 154(b) by 115 days.

(21) Appl. No.: 16/358,173

(22) Filed: Mar. 19, 2019

(65) Prior Publication Data
US 2019/0212458 A1    Jul. 11, 2019

Related U.S. Application Data

(62) Division of application No. 15/163,147, filed on May 24, 2016, now abandoned.

(51) Int. Cl.
*G01T 1/36* (2006.01)
*G01T 1/40* (2006.01)
*G01T 3/06* (2006.01)

(52) U.S. Cl.
CPC ............ *G01T 1/362* (2013.01); *G01T 1/40* (2013.01); *G01T 3/065* (2013.01)

(58) Field of Classification Search
CPC ............ G01T 1/362; G01T 1/40; G01T 3/065
See application file for complete search history.

(56) References Cited

U.S. PATENT DOCUMENTS

| 5,218,202 A | 6/1993 | Evers |
| 7,544,927 B1 | 6/2009 | Iwatschenko-Borho |

(Continued)

FOREIGN PATENT DOCUMENTS

WO    WO-2014126571 A1    8/2014

OTHER PUBLICATIONS

Glodo et al. Selected properties of Cs2LiYCl6, Cs2LiLaCl6, and Cs2LiLaBr6 scintillators, IEEE Transactions on Nuclear Science vol. 58, No. 1, pp. 333-338 (Year: 2011).*

(Continued)

*Primary Examiner* — David P Porta
*Assistant Examiner* — Shun Lee
(74) *Attorney, Agent, or Firm* — William R. McCarthy, III

(57) ABSTRACT

A spectroscopic gamma and neutron detecting device includes a scintillation detector that detects gamma and thermal neutron radiation, the scintillation detector including signal detection and amplification electronics, and a stabilization module configured to measure a pulse height spectrum of neutron radiation, determine a thermal neutron peak position in the neutron pulse height spectrum originating from cosmic ray background radiation, monitor the thermal neutron peak position in the neutron pulse height spectrum during operation of the spectroscopic gamma and neutron detecting device, and adjust the signal detection and amplification electronics based on the thermal neutron peak position in the neutron pulse height spectrum, thereby stabilizing the spectroscopic gamma and neutron detecting device.

15 Claims, 7 Drawing Sheets

(56) References Cited

U.S. PATENT DOCUMENTS 8,569,683 B2 10/2013 Freiburger et al.
2012/0326043 A1 12/2012 Duraj

OTHER PUBLICATIONS

Fanchini, "Performance of an RPM Based on Gd-lined Plastic Scintillator for Neutron and Gamma Detection," IEEE Trans. on Nuc. Sci., 63{1), 392-399, 2016.
Giaz et al., "Characterization of new scintillators: Sri2:Eu, CeBr3, GYGAG:Ce and CL YC:Ce," J. Physics: Conference Series 620 {2015), Jan. 2003; 5 pgs.
Glodo et al. Cs2LiYCl6:Ce scintillator for nuclear monitoring applications, IEEE Transactions on Nuclear Science, vol. 56, No. 3 (Jun. 2009), pp. 1257-1261.
Iwatschenko-Bohro et al., U.S. Appl. No. 15/163,212, filed May 24, 2016, specification, abstract, claims, drawings, 21 pages.
Knoll, G.F., "Radiation Detection and Measurement," 3rd Ed., 2000 {title, copyright page and table of contents).
Kowatari et al., "Altitude Variation of cosmic-ray neutron energy spectrum and ambient dose equivalent at Mt. Fuji in Japan," presented at IRPA 11, Madrid, May 2004.
Mendonca et al. Constructing and calibrating a neutron detector using cosmic rays [online], Aug. 2010, [retrieved on Jan. 11, 2018]. Retrieved from the Internet:< URL: http:// http://hallaweb.jlab.org/posters/originals/201 0/Matthew-Mendonca.pptx>.
Wang et al., "Improved neutron-gamma discrimination for a 6Li-glass neutron detector using digital signal analysis methods," Review of Sci. Ins!., 87, 013301-1 through 013301-8, 2016.
Pino F, et al., "The light output and the detection efficiency of the liquid scintillator EJ-309", Applied Radiation and Isotopes, 2014, vol. 89, pp. 79-84.

\* cited by examiner

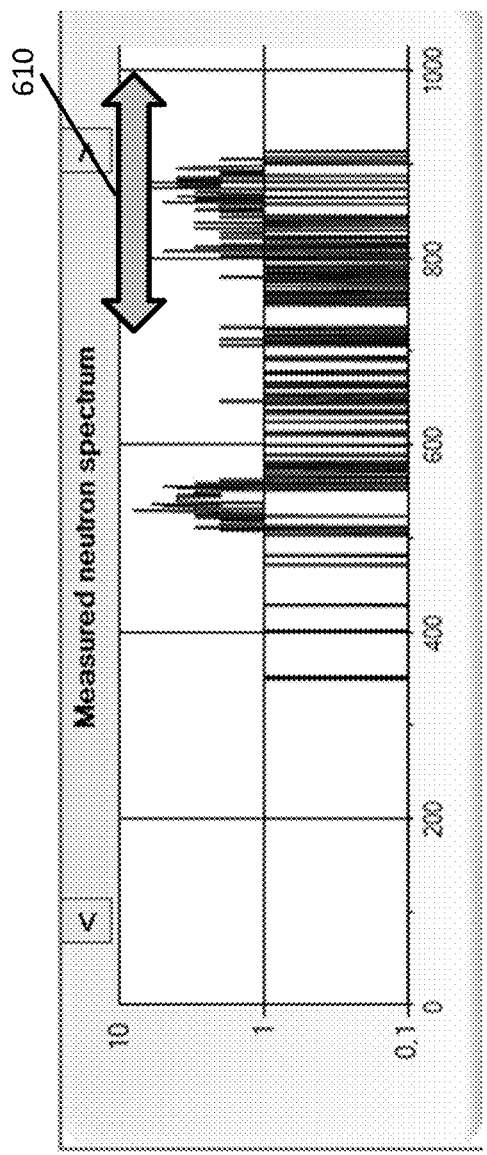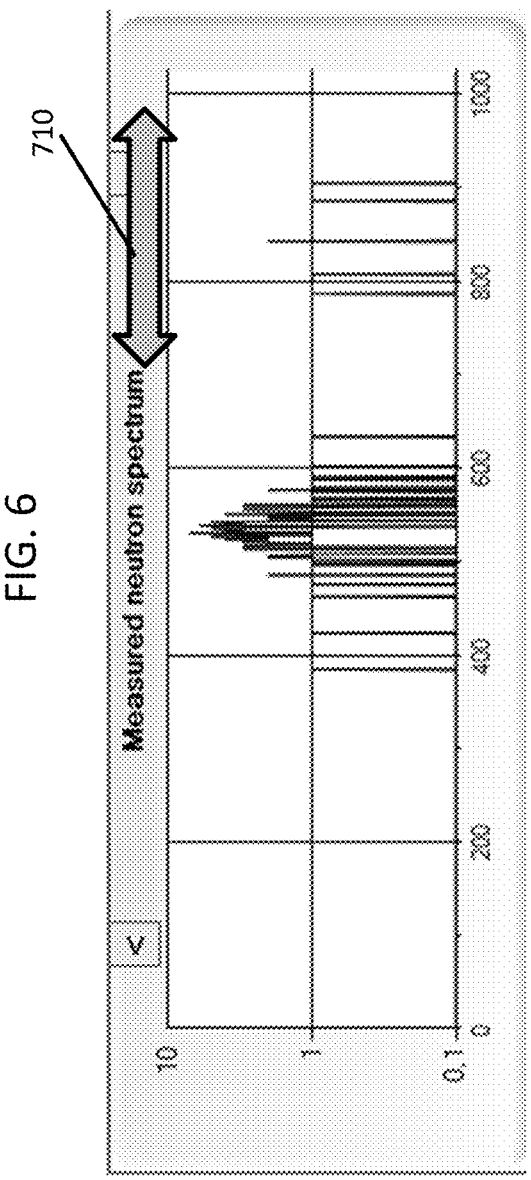
FIG. 6
FIG. 7

SYSTEM AND METHOD OF STABILIZATION OF A GAMMA AND NEUTRON DETECTING DEVICE

CROSS-REFERENCE TO RELATED APPLICATIONS

This application is a divisional United States application U.S. Ser. No. 15/163,147 filed on May 25, 2016, said application incorporated by reference herein in its entierty.

FIELD OF THE INVENTION

The present invention is generally directed to stabilization of a gamma and neutron detecting device.

BACKGROUND

Spectroscopic radiation measuring instruments require a high degree of stability regarding the whole signal generation and processing chain. Some of these instruments contain a scintillation detector which converts ionizing radiation, such as X-rays, gamma rays, and electrons into light, the number of photons being proportional to the energy of the ionizing radiation. These instruments typically also include a photon detection assembly, such as a photomultiplier (PMT) or a semiconductor component (pin-diode or silicon photomultiplier) that converts the light of the scintillator into electric pulses and a data processing system that comprises a multichannel analyzer (MCA), a data processor and a data display unit. A higher number of photons produces a higher pulse amplitude, the MCA producing a pulse height spectrum of channels arranged in order of increasing energy. See G. F. Knoll, Radiation Detection and Measurement, $3^{rd}$ Ed. (2000), (hereinafter "Knoll") hereby incorporated by reference in its entirety (however, where anything in the incorporated reference contradicts anything stated in the present application, the present application prevails).

Temperature is a typical parameter that influences the whole signal processing chain, e.g., via the light output in the crystal or amplification in the photomultiplier. A common method to account for changes in the temperature is the usage of a temperature sensor and subsequent compensation of the amplification. The underlying temperature dependency may either be generally assumed for a certain type of instrument or individually determined during factory calibration.

While this is an appropriate method to account for temperature variations, accounting for long-term drift and degradation effects of e.g., the crystal quality and the optical coupling to the photon detection assembly and/or its amplification performance require a different approach. Conventional methods include stabilization to gamma peaks originating from background gamma radiation (e.g., K-40), or a gamma check source such as Cs-137, Lu-176 or Na-22, which may be permanently or temporarily attached to the detector. See U.S. Pat. No. 7,544,927 B1 issued on Jun. 9, 2009, hereby incorporated by reference in its entirety (however, where anything in the incorporated reference contradicts anything stated in the present application, the present application prevails). These methods are prone to failure in elevated gamma radiation fields or imply inconvenient regulatory issues due to the usage and transport of radioactive material related to the check source. Other approaches use time gated LED light pulses of defined pulse height or sophisticated digital signal processing techniques analyzing the time structure of the scintillation pulses.

There is, nevertheless, a need for further improvements in stabilization of gamma and neutron detecting devices.

SUMMARY

In one embodiment, a method of stabilizing a spectroscopic gamma and neutron detecting device includes measuring a pulse height spectrum of neutron radiation using a spectroscopic gamma and neutron detecting device that includes a scintillation detector that detects gamma and thermal neutron radiation, the scintillation detector including signal detection and amplification electronics. The method then further includes determining a thermal neutron peak position in the neutron pulse height spectrum originating from cosmic ray background radiation, monitoring the thermal neutron peak position in the neutron pulse height spectrum during operation of the spectroscopic gamma and neutron detecting device, and adjusting the signal detection and amplification electronics based on the thermal neutron peak position in the neutron pulse height spectrum, thereby stabilizing the spectroscopic gamma and neutron detecting device. The scintillation detector can include a scintillation crystal including at least 2 atomic % Li-6, such as a Cerium (Ce)-doped Elpasolite having a chemical formula $A_2LiLnX_6$:Ce, wherein A is any one of Sodium (Na), Potassium (K), Rubidium (Rb), or Cesium (Cs), Ln is any one of Scandium (Sc), Yttrium (Y), Lanthanum (La), or Lutetium (Lu), and X is any one of Bromine (Br) or iodine (I). In some embodiments, the scintillation crystal can be any one of $Cs_2LiYCl_6$:Ce (CLYC), $Cs_2LiLaCl_6$:Ce (CLLC), $Cs_2LiLaBr_6$:Ce (CLLB), or $Cs_2LiYBr_6$:Ce (CLYB). In certain embodiments, determining the thermal neutron peak position in the neutron pulse height spectrum can include pulse shape discrimination (PSD) that distinguishes between gamma and neutron radiation.

In another embodiment, a spectroscopic gamma and neutron detecting device includes a scintillation detector that detects gamma and thermal neutron radiation, the scintillation detector including signal detection and amplification electronics, and a stabilization module configured to measure a pulse height spectrum of neutron radiation, determine a thermal neutron peak position in the neutron pulse height spectrum originating from cosmic ray background radiation, monitor the thermal neutron peak position in the neutron pulse height spectrum during operation of the spectroscopic gamma and neutron detecting device, and adjust the signal detection and amplification electronics based on the thermal neutron peak position in the neutron pulse height spectrum, thereby stabilizing the spectroscopic gamma and neutron detecting device. In some embodiments, the stabilization module can be further configured to include pulse shape discrimination (PSD) that distinguishes between gamma and neutron radiation to determine the thermal neutron peak position in the neutron pulse height spectrum. The scintillation detector can include a scintillation crystal including at least 2 atomic % Li-6, such as a Cerium (Ce)-doped Elpasolite having a chemical formula $A_2LiLnX_6$:Ce, wherein A is any one of Sodium (Na), Potassium (K), Rubidium (Rb), or Cesium (Cs), Ln is any one of Scandium (Sc), Yttrium (Y), Lanthanum (La), or Lutetium (Lu), and X is any one of Bromine (Br) or iodine (I). In some embodiments, the scintillation crystal can be any one of $Cs_2LiYCl_6$:Ce (CLYC), $Cs_2LiLaCl_6$:Ce (CLLC), $Cs_2LiLaBr_6$:Ce (CLLB), or $Cs_2LiYBr_6$:Ce (CLYB).

In yet another embodiment, a method of distinguishing between gamma and neutron counts recorded by a spectroscopic gamma and neutron detecting device includes providing a spectroscopic gamma and neutron detecting device that includes a scintillation detector that detects gamma and neutron radiation, the detecting device including pulse shape discrimination (PSD) electronics that distinguish between gamma and neutron counts, and measuring a pulse height spectrum of gamma radiation counts and a pulse height spectrum of neutron radiation counts using the detecting device, both gamma and neutron radiation originating from cosmic ray background radiation. The method then includes adjusting a PSD parameter based on a ratio between neutron radiation counts with energy greater than a threshold neutron energy and a sum of gamma radiation counts with energy greater than a threshold gamma energy and neutron radiation counts with energy greater than the threshold neutron energy. The threshold neutron energy can be 4 MeV, and the threshold gamma energy can be 3 MeV. The scintillation detector is as described above.

In still another embodiment, a spectroscopic gamma and neutron detecting device includes a scintillation detector that detects gamma and neutron radiation, pulse shape discrimination (PSD) electronics that distinguish between gamma and neutron counts detected by the scintillation detector, and a PSD control module configured to measure a pulse height spectrum of gamma radiation counts and a pulse height spectrum of neutron radiation counts using the detecting device, both gamma and neutron radiation originating from cosmic ray background radiation, and adjust a PSD parameter based on a ratio between neutron radiation counts with energy greater than a threshold neutron energy and a sum of gamma radiation counts with energy greater than a threshold gamma energy and neutron radiation counts with energy greater than the threshold neutron energy. The threshold neutron energy, threshold gamma energy, and scintillation detector are as described above.

The invention has many advantages, including enabling stabilization of spectroscopic gamma and neutron detecting devices without using any conventional gamma check sources or any conventional neutron check sources such as AmBe or Cf-252.

BRIEF DESCRIPTION OF THE DRAWINGS

FIG. 6 is a neutron pulse height spectrum with a PSD parameter of 142.

FIG. 7 is a neutron pulse height spectrum with a PSD parameter of 133.

Like reference numerals refer to corresponding parts throughout the several views of the drawings.

DETAILED DESCRIPTION OF EMBODIMENTS

Figure 1:
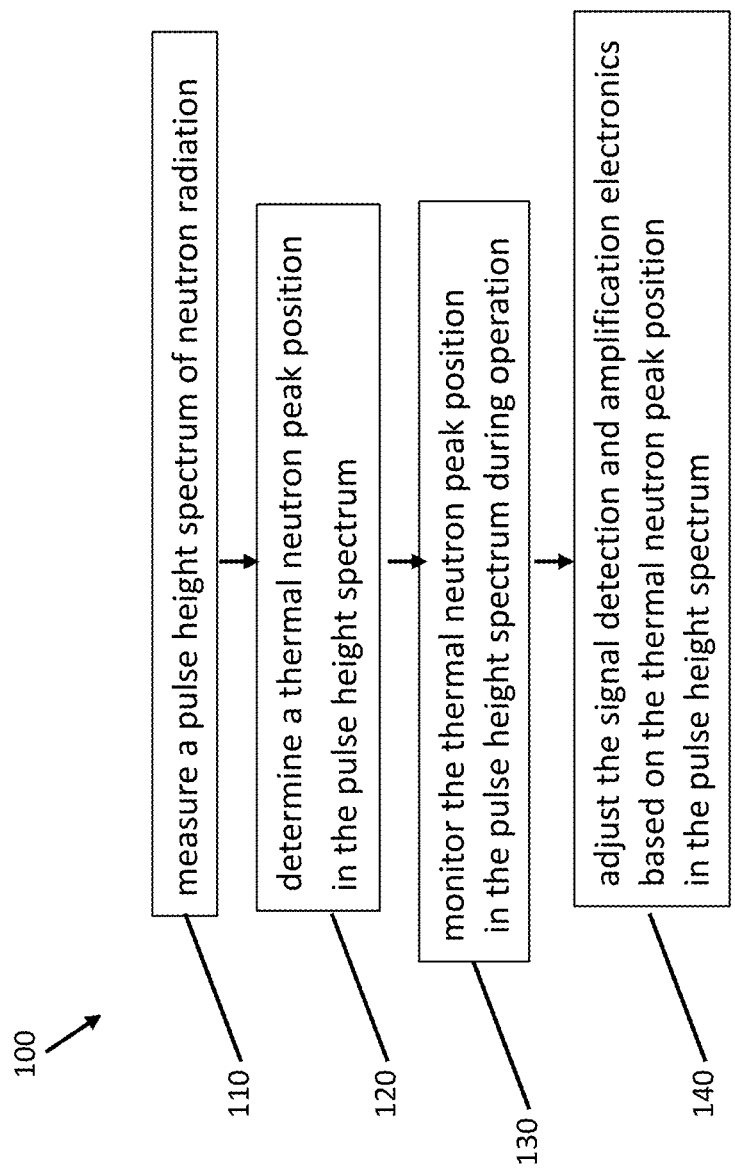
FIG. 1 is a flowchart of a method of stabilizing a spectroscopic gamma and neutron detecting device according to an exemplary embodiment of the invention.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Described herein are systems and methods of automatic spectral stabilization for scintillation detectors that are sensitive to both gamma and thermal neutron radiation. Furthermore, performance tests and calibration of the neutron detection capabilities of spectroscopic gamma and neutron detecting devices without requiring a conventional neutron source such as AmBe or Cf-252 are described herein.

Spectroscopic scintillation detectors including at least 2 atomic % Li-6, such as a Cerium (Ce)-doped Elpasolite detect low energy neutrons by the Li-6 (n, $\alpha$) H-3 reaction, which gives rise to a well-defined peak in the neutron related pulse height spectrum, that can be distinguished from terrestrial gamma radiation by pulse height analysis, and further distinguishable by pulse shape discrimination.

Since the neutron spectrum is virtually free of any other background events, the thermal neutron peak can be measured with high precision even for the low neutron fluence rate that relates to the neutron background radiation caused by the secondary cosmic radiation that is present on the surface of the earth. See U.S. patent application titled "Method of Operational Status Verification for a Neutron Detecting Device", hereby incorporated by reference in its entirety (however, where anything in the incorporated reference contradicts anything stated in the present application, the present application prevails). The derived thermal neutron related peak position in the spectrum can be used to stabilize the detector electronics in order to compensate for any drift effect or degradation of the crystal performance. In the absence of a man-made neutron source, the number of counts under the thermal neutron peak is a precise measure of the thermal neutron fluence of the natural background radiation. The systems and methods described herein are also applicable at elevated gamma radiation levels as long as pile-up effects can be neglected, which is typically the case below 1,000 cps.

Figure 2:
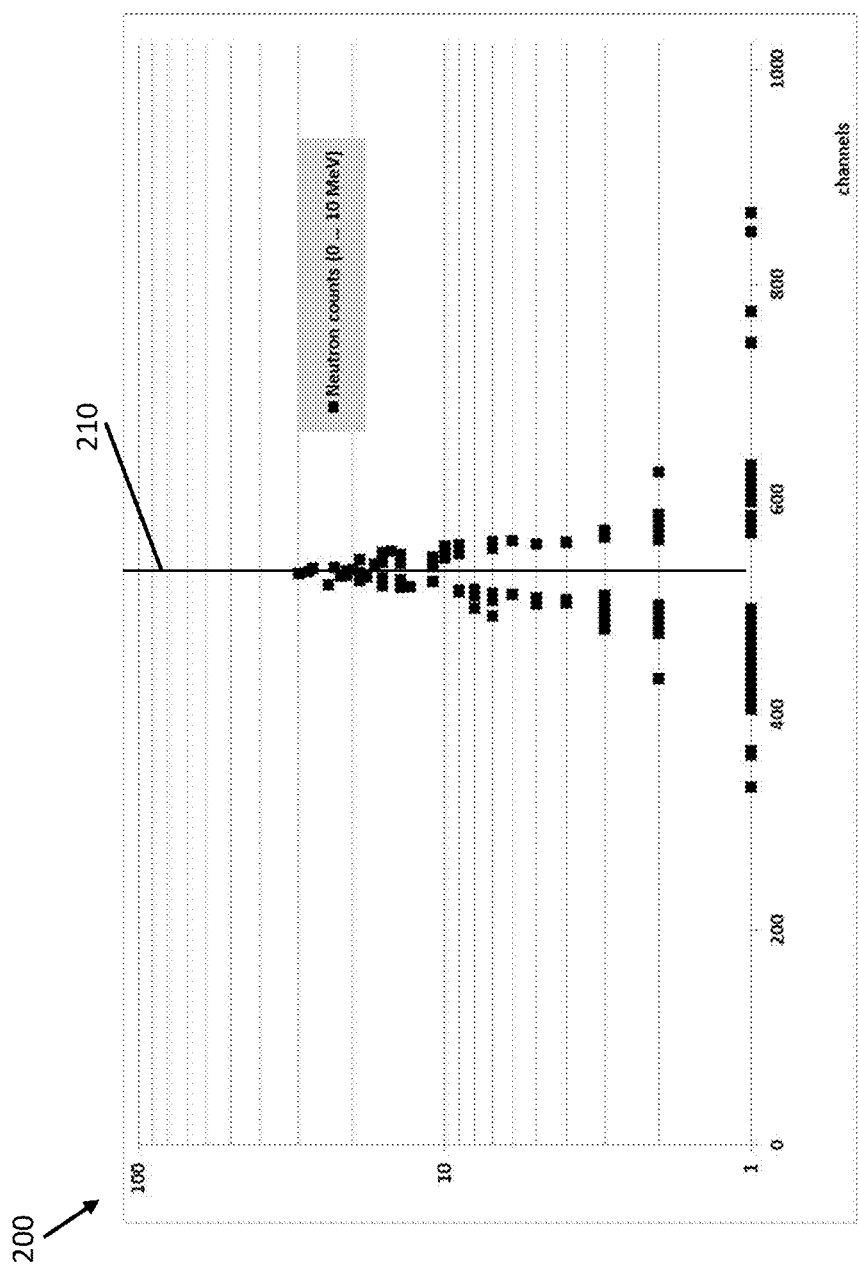
FIG. 2 is a neutron pulse height spectrum of cosmic ray background radiation showing neutron counts with energies in a range of between 0 eV and 10 MeV.
Figure 3:
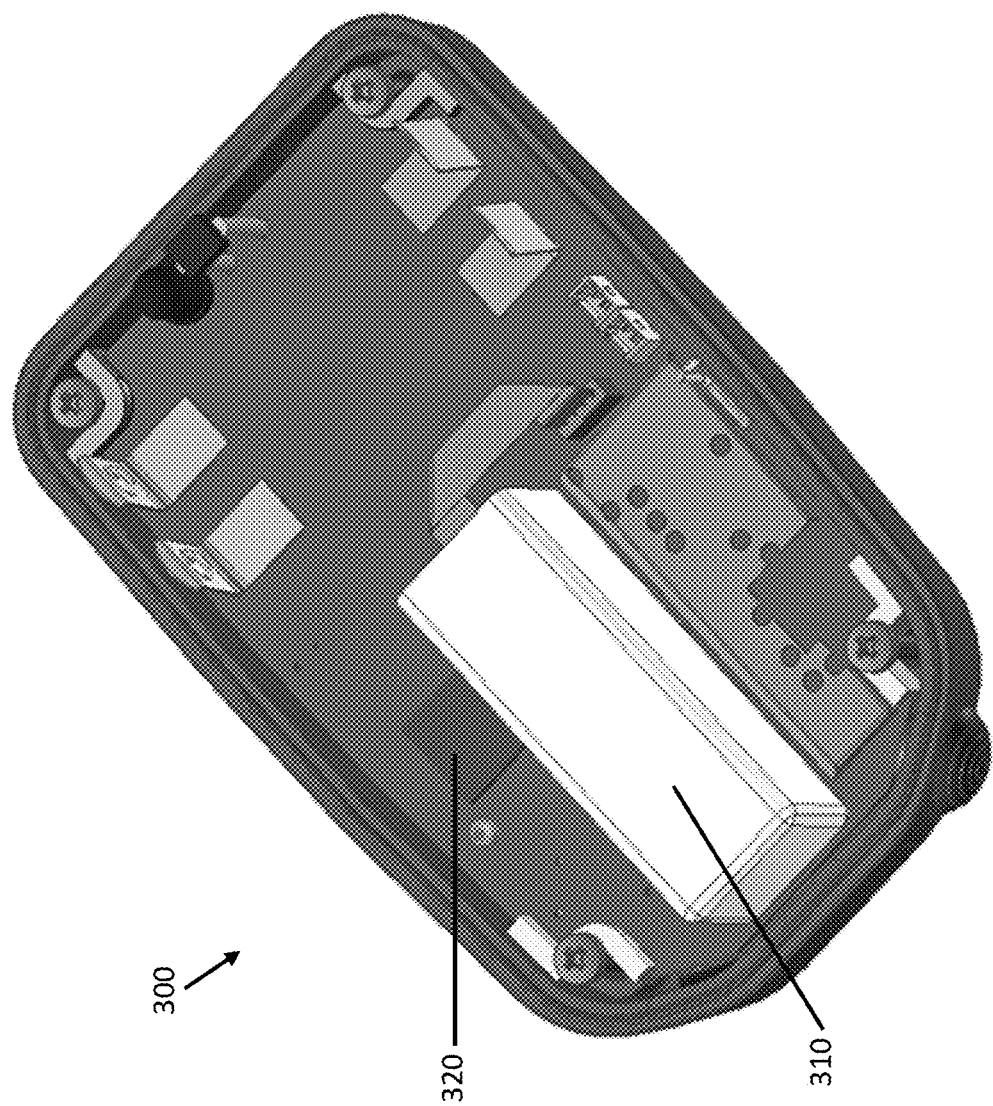
FIG. 3 is a schematic illustration of a spectroscopic gamma and neutron detecting device including a stabilization module according to an exemplary embodiment of the invention.

As shown in FIG. 1, a method 100 of stabilizing a spectroscopic gamma and neutron detecting device includes at step 110 measuring a pulse height spectrum 200 of neutron radiation, as shown in FIG. 2, using a spectroscopic gamma and neutron detecting device 300 shown in FIG. 3 that includes a scintillation detector 310 that detects gamma and thermal neutron radiation, the scintillation detector 310 including signal detection and amplification electronics. The method then further includes at step 120 determining a thermal neutron peak position 210 in the neutron pulse height spectrum 200 originating from cosmic ray background radiation, monitoring at step 130 the thermal neutron peak position 210 in the neutron pulse height spectrum 200 during operation of the spectroscopic gamma and neutron detecting device 300, and at step 140 adjusting the signal detection and amplification electronics based on the thermal neutron peak position 210 in the neutron pulse height spectrum 200, thereby stabilizing the spectroscopic gamma and neutron detecting device 300. Turning to FIG. 2, if the thermal neutron peak position 210 drifts over time from channel 550 to channel 530, for example, then the signal amplification by the signal detection and amplification electronics is adjusted to return the thermal neutron peak position 210 back to channel 550, adjusting the sensitivity of the spectroscopic gamma and neutron detecting device 300 to both gamma and neutron radiation, thereby stabilizing the spectroscopic gamma and neutron detecting device 300. In one embodiment, the method 100 is implemented in a computer program product carrying a computer program which, when loaded into a programmable processor, executes the method of monitoring the thermal neutron peak position in the neutron pulse height spectrum and adjusting signal amplification based on the thermal neutron peak position.

The scintillation detector 310 includes a scintillation crystal including at least 2 atomic % Li-6, such as a Cerium (Ce)-doped Elpasolite having a chemical formula $A_2LiLnX_6$:Ce, wherein A is any one of Sodium (Na), Potassium (K), Rubidium (Rb), or Cesium (Cs), Ln is any one of Scandium (Sc), Yttrium (Y), Lanthanum (La), or Lutetium (Lu), and X is any one of Bromine (Br) or iodine (I). In some embodiments, the scintillation crystal is any one of $Cs_2LiYCl_6$:Ce (CLYC), $Cs_2LiLaCl_6$:Ce (CLLC), $Cs_2LiLaBr_6$:Ce (CLLB), or $Cs_2LiYBr_6$:Ce (CLYB).

In certain embodiments, determining the thermal neutron peak position in the neutron pulse height spectrum includes pulse shape discrimination (PSD) that distinguishes between gamma and neutron radiation, due to the different rates of decay of the light generated by neutrons and gamma radiation. See Knoll.

In another embodiment, shown in FIG. 3, a spectroscopic gamma and neutron detecting device 300 includes a scintillation detector 310 that detects gamma and thermal neutron radiation, the scintillation detector 310 including signal detection and amplification electronics, and a stabilization module 320 configured to measure a pulse height spectrum of neutron radiation, determine a thermal neutron peak position in the neutron pulse height spectrum originating from cosmic ray background radiation, monitor the thermal neutron peak position in the neutron pulse height spectrum during operation of the spectroscopic gamma and neutron detecting device, and adjust the signal detection and amplification electronics based on the thermal neutron peak position in the neutron pulse height spectrum, thereby stabilizing the spectroscopic gamma and neutron detecting device. In some embodiments, the stabilization module can be further configured to include pulse shape discrimination (PSD) as described above. The scintillation detector 310 is as described above.

As described above, spectroscopic gamma and neutron detecting devices typically include pulse shape discrimination (PSD) that distinguishes between gamma and neutron radiation. PSD electronics include a pulse shape (PSD) parameter that determines whether the event is recorded as a neutron or gamma radiation count. Described herein are systems and methods of adjusting the PSD parameter using the neutron and the ionizing part of the cosmic ray background radiation. If the total count rate is compatible with natural background radiation (typically less than 0.2 µSv/h), then the number of neutron counts with a pulse height in the spectrum equivalent to an energy above a threshold neutron energy of typically 30% above the thermal neutron peak is very small. In the absence of a high energy neutron source, which may give rise to neutron events originating from fast neutron reactions in some crystals, such as Cl-35 (n, p) S-35, the true ratio of registered fast neutrons reactions to detected ionizing particles, such as muons, with energy greater than a threshold gamma energy (e.g., 3 MeV) is less than 0.001. As described below, the PSD parameter is adjusted to match this known distribution of natural background radiation.

Figure 4:
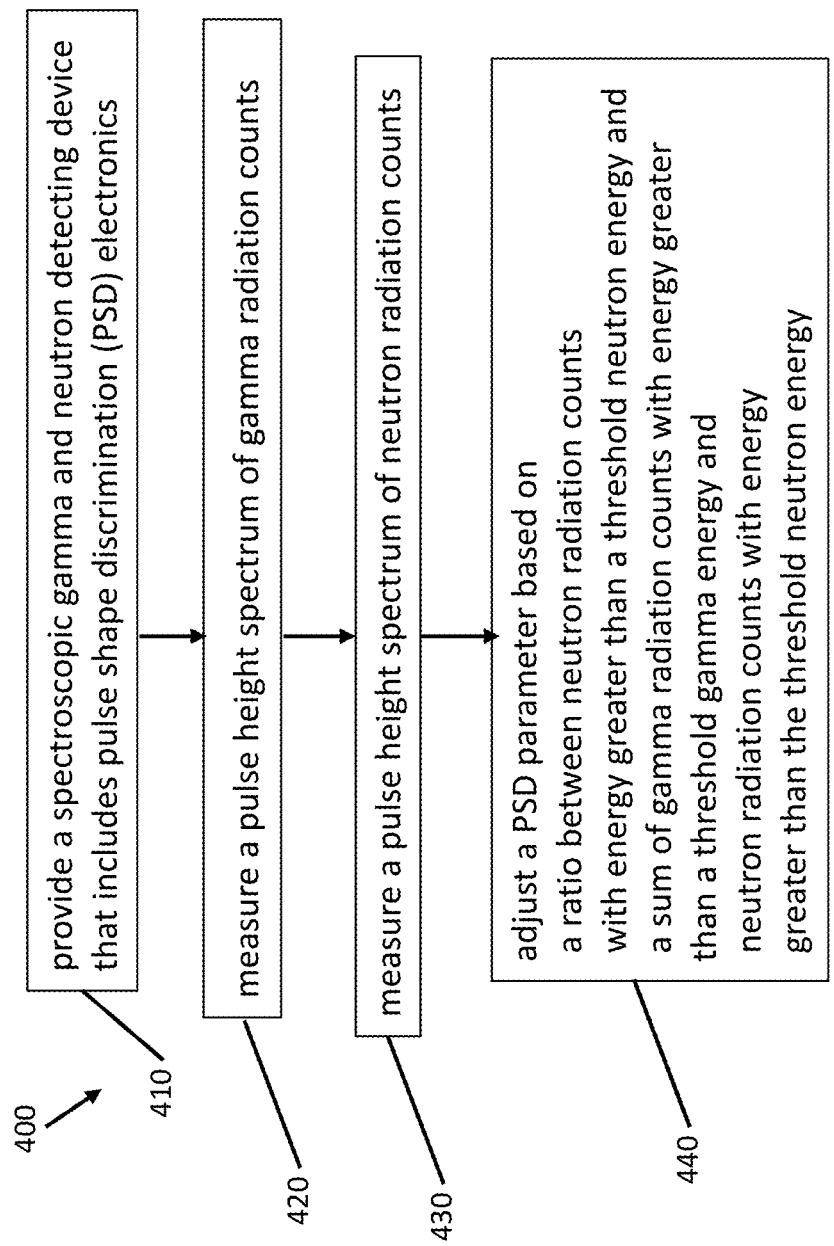
FIG. 4 is a flowchart of a method of distinguishing between gamma and neutron counts recorded by a spectroscopic gamma and neutron detecting device according to an exemplary embodiment of the invention.

As shown in FIG. 4, a method 400 of distinguishing between gamma and neutron counts recorded by a spectroscopic gamma and neutron detecting device includes at step 410 providing a spectroscopic gamma and neutron detecting device 300 as shown in FIG. 3 that includes a scintillation detector 310 that detects gamma and neutron radiation as described above, the detecting device including pulse shape discrimination (PSD) electronics that distinguish between gamma and neutron counts, and at step 420 measuring a pulse height spectrum of gamma radiation counts and at step 430 measure a pulse height spectrum of neutron radiation counts using the detecting device, both gamma and neutron radiation originating from cosmic ray background radiation.

The method then includes at step 440 adjusting a PSD parameter based on a ratio between neutron radiation counts with energy greater than a threshold neutron energy and a sum of gamma radiation counts with energy greater than a threshold gamma energy and neutron radiation counts with energy greater than the threshold neutron energy. In some embodiments, the threshold neutron energy is 4 MeV, and the threshold gamma energy is 3 MeV. See Kowatari et al., Sequential monitoring of cosmic-ray neutrons and ionizing components in Japan, presented at IRPA 11 Madrid, May 2004, and hereby incorporated by reference in its entirety (however, where anything in the incorporated reference contradicts anything stated in the present application, the present application prevails). A typical value for the ratio is 0.05. A lower value, such as 0.01, would require sampling 5 times longer for the same statistical accuracy. In one embodiment, the method 400 is implemented in a computer program product carrying a computer program which, when loaded into a programmable processor, executes the method of measuring a pulse height spectrum of gamma radiation counts and a pulse height spectrum of neutron radiation counts using the detecting device, and adjusting a PSD parameter based on a ratio between neutron radiation counts with energy greater than a threshold neutron energy and a sum of gamma radiation counts with energy greater than a threshold gamma energy and neutron radiation counts with energy greater than the threshold neutron energy.

Figure 5:
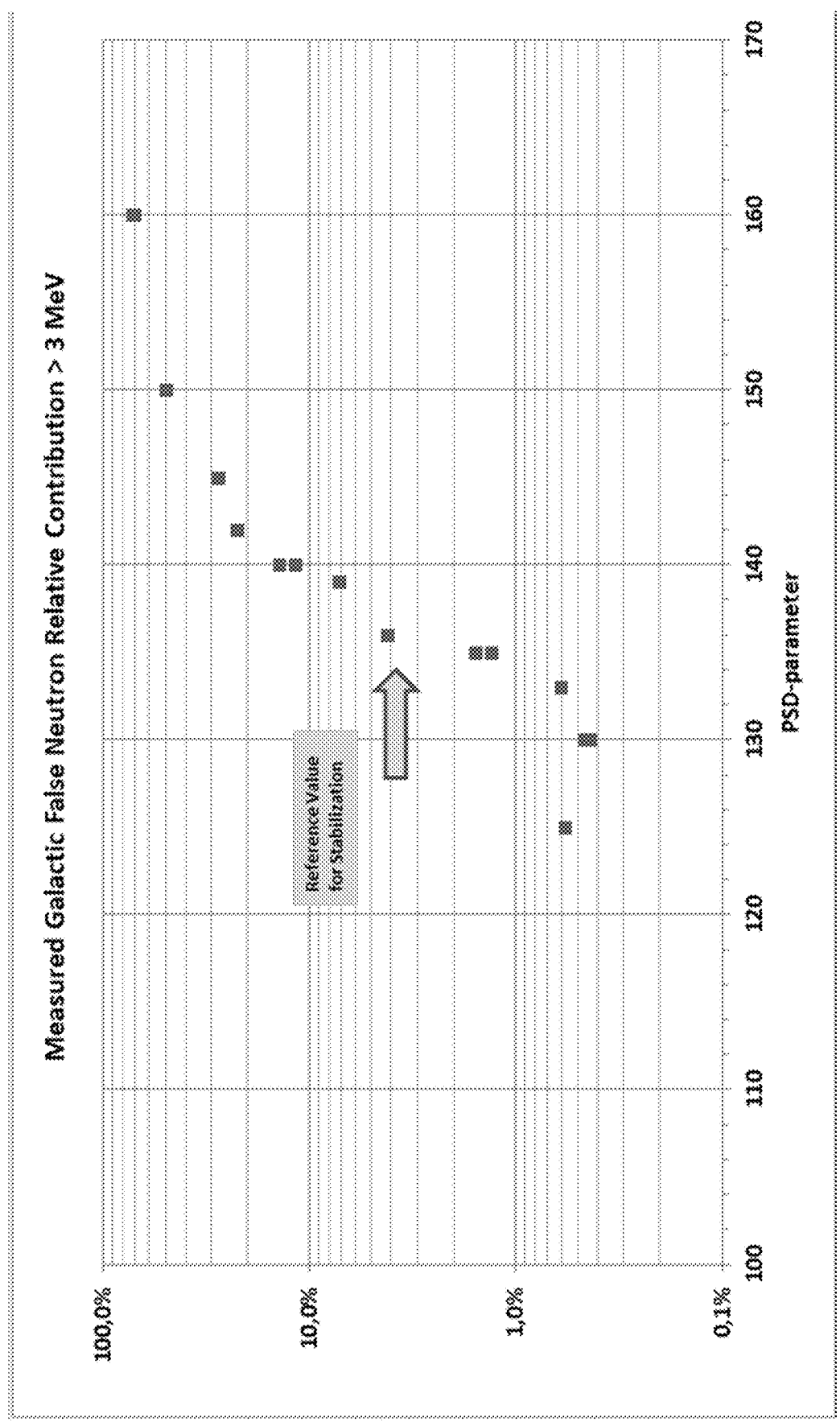
FIG. 5 is a graph of measured cosmic false neutron relative contribution (%) with energies greater than 3 MeV as a function of PSD parameter.

An example of the influence of the PSD parameter on the counts recorded as neutrons with energy greater than 3 MeV, that is, actual muons recorded incorrectly as neutrons, is shown in FIG. 5 for cosmic ray background radiation at an altitude of 330 m recorded for 10,000 seconds. As the PSD parameter increases, the recorded relative percent contribution of events with energy greater than 3 MeV recorded incorrectly as neutrons increases. As shown in FIG. 6, for a PSD parameter of 142, the neutron pulse height spectrum shows many counts recorded in the channels for energy greater than 3 MeV indicated by arrow 610. By contrast, processing the same data with a PSD parameter of 133 yields the neutron pulse height spectrum shown in FIG. 7, with few counts recorded in the channels for energy greater than 3 MeV indicated by arrow 710, with those events recorded correctly as muons in the gamma pulse height spectrum (not shown).

Figure 8:
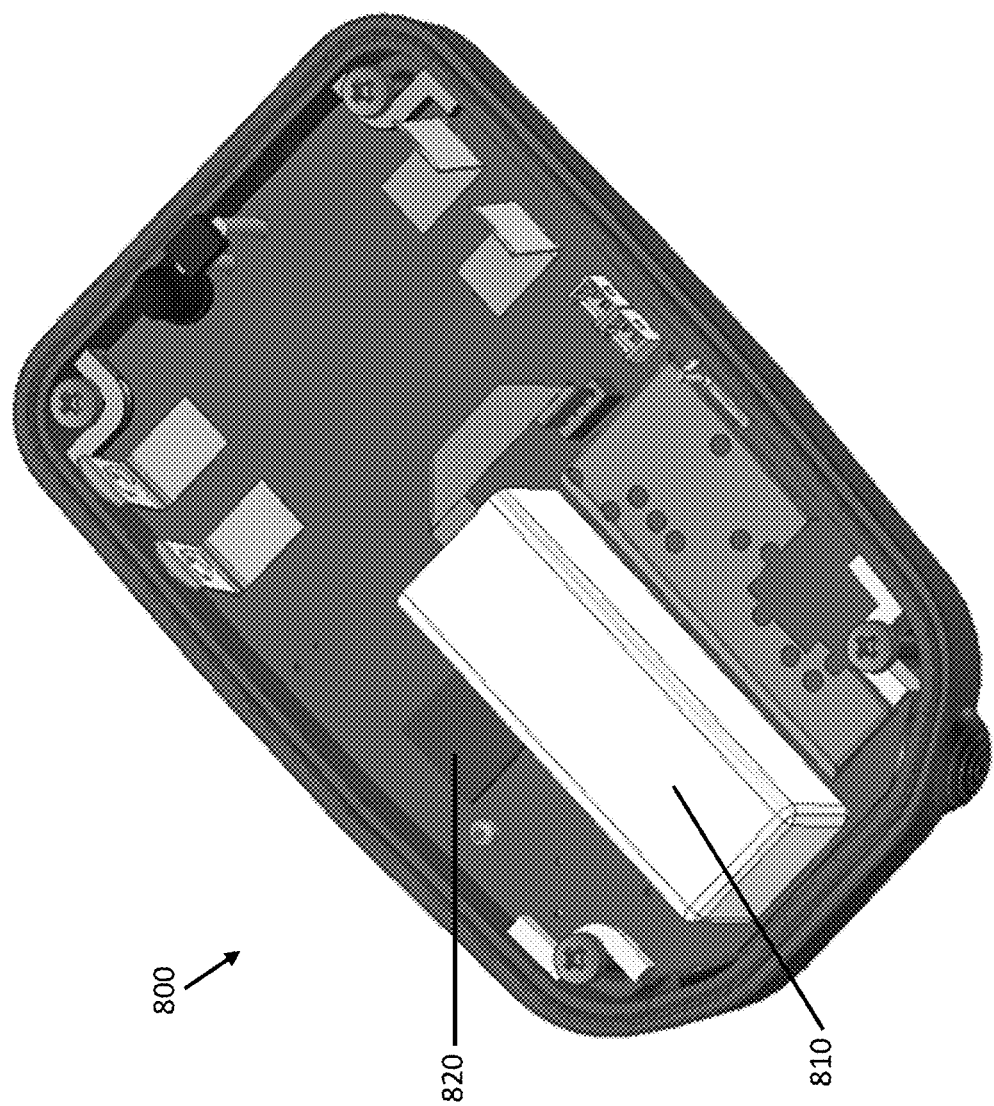
FIG. 8 is a schematic illustration of a spectroscopic gamma and neutron detecting device including a PSD control module according to an exemplary embodiment of the invention.

In still another embodiment shown in FIG. 8, a spectroscopic gamma and neutron detecting device 800 includes a scintillation detector 810 that detects gamma and neutron radiation, pulse shape discrimination (PSD) electronics that distinguish between gamma and neutron counts detected by the scintillation detector, and a PSD control module 820 configured to measure a pulse height spectrum of gamma radiation counts and a pulse height spectrum of neutron radiation counts using the detecting device, both gamma and neutron radiation originating from cosmic ray background radiation, and adjust a PSD parameter based on a ratio between neutron radiation counts with energy greater than a threshold neutron energy and a sum of gamma radiation counts with energy greater than a threshold gamma energy and neutron radiation counts with energy greater than the threshold neutron energy. The threshold neutron energy, threshold gamma energy, and scintillation detector are as described above.

While the present invention has been illustrated by a description of exemplary embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of distinguishing between gamma and neutron counts recorded by a spectroscopic gamma and neutron detecting device, the method comprising:
    a. providing a spectroscopic gamma and neutron detecting device that includes a scintillation detector that detects gamma and neutron radiation, the detecting device including pulse shape discrimination (PSD) electronics that include a PSD parameter to distinguish between gamma radiation counts and neutron radiation counts;
    b. measuring a pulse height spectrum of the gamma radiation counts originating from cosmic ray background radiation using the detecting device with the PSD parameter;
    c. measuring a pulse height spectrum of the neutron radiation counts originating from the cosmic ray background using the detecting device with the PSD parameter, wherein the pulse height spectrum of the neutron radiation counts comprises incorrectly recorded counts from ionizing radiation originating from the cosmic ray background; and
    d. adjusting the PSD parameter based on a ratio between neutron radiation counts with energy greater than a threshold neutron energy and a sum of gamma radiation counts with energy greater than a threshold gamma energy and neutron radiation counts with energy greater than the threshold neutron energy, wherein the PSD parameter is adjusted to correctly record the ionizing radiation originating from the cosmic ray background in the pulse height spectrum of gamma radiation counts.

2. The method of claim 1, wherein the threshold neutron energy is 4 MeV and the threshold gamma energy is 3 MeV.

3. The method of claim 1, wherein the scintillation detector comprises a scintillation crystal including at least 2 atomic % Li-6.

4. The method of claim 3, wherein the scintillation crystal is a Cerium (Ce)-doped Elpasolite having a chemical formula $A_2LiLnX_6$:Ce, wherein A is any one of Sodium (Na), Potassium (K), Rubidium (Rb), or Cesium (Cs), Ln is any one of Scandium (Sc), Yttrium (Y), Lanthanum (La), or Lutetium (Lu), and X is any one of Bromine (Br) or iodine (I).

5. The method of claim 3, wherein the scintillation crystal is one of $Cs_2LiYCl_6$:Ce (CLYC), $Cs_2LiLaCl_6$:Ce (CLLC), $Cs_2LiLaBr_6$:Ce (CLLB), or $Cs_2LiYBr_6$:Ce (CLYB).

6. A spectroscopic gamma and neutron detecting device comprising:
    a. a scintillation detector that detects gamma and neutron radiation;
    b. pulse shape discrimination (PSD) electronics that include a PSD parameter to distinguish between gamma radiation counts and neutron radiation counts detected by the scintillation detector; and
    c. a PSD control module configured to:
        i. measure a pulse height spectrum of the gamma radiation counts originating from cosmic ray background radiation using the detecting device with the PSD parameter;
        ii. measure a pulse height spectrum of the neutron radiation counts originating from the cosmic ray background radiation using the detecting device with the PSD parameter, wherein the pulse height spectrum of the neutron radiation counts comprises incorrectly recorded counts from ionizing radiation originating from the cosmic ray background; and
        iii. adjust the PSD parameter based on a ratio between neutron radiation counts with energy greater than a threshold neutron energy and a sum of gamma radiation counts with energy greater than a threshold gamma energy and neutron radiation counts with energy greater than the threshold neutron energy, wherein the PSD parameter is adjusted to correctly record the ionizing radiation originating from the cosmic ray background in the pulse height spectrum of gamma radiation counts.

7. The device of claim 6, wherein the threshold neutron energy is 4 MeV and the threshold gamma energy is 3 MeV.

8. The device of claim 6, wherein the scintillation detector comprises a scintillation crystal including at least 2 atomic % Li-6.

9. The device of claim 8, wherein the scintillation crystal is a Cerium (Ce)-doped Elpasolite having a chemical formula $A_2LiLnX_6$:Ce, wherein A is any one of Sodium (Na), Potassium (K), Rubidium (Rb), or Cesium (Cs), Ln is any one of Scandium (Sc), Yttrium (Y), Lanthanum (La), or Lutetium (Lu), and X is any one of Bromine (Br) or iodine (I).

10. The device of claim 8, wherein the scintillation crystal is one of $Cs_2LiYCl_6$:Ce (CLYC), $Cs_2LiLaCl_6$:Ce (CLLC), $Cs_2LiLaBr_6$:Ce (CLLB), or $Cs_2LiYBr_6$:Ce (CLYB).

11. A computer program product carrying a computer program which, when loaded into a programmable processor, executes the method of:
   a. measuring a pulse height spectrum of gamma radiation counts originating from cosmic ray background radiation using a spectroscopic gamma and neutron detecting device with a PSD parameter, wherein the detecting device that includes a scintillation detector that detects gamma and neutron radiation, the detecting device including pulse shape discrimination (PSD) electronics that include the PSD parameter to distinguish between gamma radiation counts and neutron radiation counts;
   b. measuring a pulse height spectrum of neutron radiation counts originating from the cosmic ray background using the detecting device with the PSD parameter, wherein the pulse height spectrum of the neutron radiation counts comprises incorrectly recorded counts from ionizing radiation originating from the cosmic ray background; and
   c. adjusting the PSD parameter based on a ratio between neutron radiation counts with energy greater than a threshold neutron energy and a sum of gamma radiation counts with energy greater than a threshold gamma energy and neutron radiation counts with energy greater than the threshold neutron energy, wherein the PSD parameter is adjusted to correctly record the ionizing radiation originating from the cosmic ray background in the pulse height spectrum of gamma radiation counts.

12. The computer program product of claim 11, wherein the threshold neutron energy is 4 MeV and the threshold gamma energy is 3 MeV.

13. The computer program product of claim 11, wherein the scintillation detector comprises a scintillation crystal including at least 2 atomic % Li-6.

14. The computer program product of claim 13, wherein the scintillation crystal is a Cerium (Ce)-doped Elpasolite having a chemical formula $A_2LiLnX_6$:Ce, wherein A is any one of Sodium (Na), Potassium (K), Rubidium (Rb), or Cesium (Cs), Ln is any one of Scandium (Sc), Yttrium (Y), Lanthanum (La), or Lutetium (Lu), and X is any one of Bromine (Br) or iodine (I).

15. The computer program product of claim 13, wherein the scintillation crystal is one of $Cs_2LiYCl_6$:Ce (CLYC), $Cs_2LiLaCl_6$:Ce (CLLC), $Cs_2LiLaBr_6$:Ce (CLLB), or $Cs_2LiYBr_6$:Ce (CLYB).

* * * * *